United States Patent
Ohno et al.

(10) Patent No.: US 7,803,312 B2
(45) Date of Patent: Sep. 28, 2010

(54) CERAMIC HONEYCOMB STRUCTURAL BODY AND METHOD OF MANUFACTURING THE SAME

(75) Inventors: Kazushige Ohno, Gifu (JP); Hiroki Sato, Gifu (JP); Masayuki Hayashi, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 942 days.

(21) Appl. No.: 11/618,019

(22) Filed: Dec. 29, 2006

(65) Prior Publication Data

US 2007/0190350 A1  Aug. 16, 2007

Related U.S. Application Data

(63) Continuation of application No. PCT/JP2006/301899, filed on Jan. 30, 2006.

(30) Foreign Application Priority Data

Feb. 4, 2005 (JP) .............................. 2005-028335

(51) Int. Cl.
   *C04B 33/32* (2006.01)
   *C04B 35/64* (2006.01)
(52) U.S. Cl. .................................................. 264/630
(58) Field of Classification Search ........................ None
   See application file for complete search history.

(56) References Cited

U.S. PATENT DOCUMENTS

| | | | |
|---|---|---|---|
| 4,455,180 A | 6/1984 | Hillman et al. | |
| 4,946,487 A | 8/1990 | Butkus | |
| 5,914,187 A | 6/1999 | Naruse et al. | |
| 6,187,256 B1 * | 2/2001 | Aslan et al. | 264/666 |
| 6,669,751 B1 | 12/2003 | Ohno et al. | |
| 7,284,980 B2 | 10/2007 | Saijo et al. | |
| 7,341,614 B2 | 3/2008 | Hayashi et al. | |
| 7,348,049 B2 | 3/2008 | Yoshida | |
| 7,393,376 B2 | 7/2008 | Taoka et al. | |
| 7,396,586 B2 | 7/2008 | Ohno et al. | |

(Continued)

FOREIGN PATENT DOCUMENTS

EP   219383   4/1987

(Continued)

OTHER PUBLICATIONS

International Preliminary Report on Patentability, PCT/JP2006/301899, mailed Aug. 16, 2007 (English version included).

*Primary Examiner*—David R Sample
*Assistant Examiner*—Nicole T Gugliotta
(74) *Attorney, Agent, or Firm*—Ditthavong Mori & Steiner, P.C.

(57) ABSTRACT

A ceramic honeycomb structural body is manufactured by molding silicon carbide raw powders into a honeycomb pillar shape and then firing it to form a sintered body. The silicon carbide raw powders are comprised of about 60 to about 80% by mass of particles of first particle group having one frequency peak in the particle size distribution and a particle size of 1.0 μm to about 100 μm, and about 20 to about 40% by mass of particles of a second particle group having a particle size of about 0.1 μm or more and less than 1.0 μm.

8 Claims, 2 Drawing Sheets

U.S. PATENT DOCUMENTS

| | | |
|---|---|---|
| 7,449,427 B2 | 11/2008 | Ohno et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 2004/0055265 A1 | 3/2004 | Ohno et al. |
| 2004/0101654 A1 | 5/2004 | Hijikata |
| 2004/0161596 A1 | 8/2004 | Taoka et al. |
| 2005/0076626 A1 | 4/2005 | Kudo et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0105139 A1 | 5/2006 | Suwabe et al. |
| 2006/0108347 A1 | 5/2006 | Koyama et al. |
| 2006/0118546 A1 | 6/2006 | Saijo |
| 2006/0166820 A1 | 7/2006 | Ogyu et al. |
| 2006/0172113 A1 | 8/2006 | Kunieda |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0269722 A1 | 11/2006 | Yamada |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0158879 A1 | 7/2007 | Suwabe et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190289 A1 | 8/2007 | Fujita |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 0369330 | 5/1990 |
| EP | 1 533 032 A1 | 6/2003 |
| EP | 1479881 | 11/2004 |
| EP | 1 550 494 A1 | 7/2005 |
| FR | 2587026 | 3/1987 |
| JP | 8-217565 | 8/1996 |
| JP | 8-281036 | 10/1996 |
| JP | 9-249458 | 9/1997 |
| JP | 2000-279729 | 10/2000 |
| JP | 2000-351614 | 12/2000 |
| JP | 2001-138416 | 5/2001 |
| JP | 2003-165765 | 6/2003 |
| WO | WO 03/106028 A1 | 12/2003 |
| WO | PCT/JP2006/301899 | 3/2006 |
| WO | WO 2006/035822 A1 | 4/2006 |
| WO | WO 2006/035823 A1 | 4/2006 |
| WO | WO 2006/041174 A1 | 4/2006 |
| WO | WO 2006/057344 A1 | 6/2006 |

* cited by examiner

CERAMIC HONEYCOMB STRUCTURAL BODY AND METHOD OF MANUFACTURING THE SAME

CROSS-REFERENCE TO RELATED APPLICATION

This application is a continuation of International Application No. PCT/JP2006/301899 filed on Jan. 30, 2006, claiming a priority of Japanese Patent Application of 2005-28335 filed on Feb. 4, 2005. The contents of these applications are incorporated herein by reference in its entirety.

TECHNICAL FIELD

This invention relates to a ceramic honeycomb structural body and a method of manufacturing the same.

BACKGROUND ART

The exhaust gas discharged from the internal combustion engine in vehicles such as truck or bus, or construction vehicles contains particulates harmfully exerting upon environment and human body. For this end, there are recently studied techniques for collecting and removing the particulates from the exhaust gas. As an example of such techniques is developed a ceramic honeycomb filer for the purification of the exhaust gas in order to collect and remove the particulates from the exhaust gas.

As a typical structure of this ceramic honeycomb structural body, as shown in FIG. 1A, there is mentioned a ceramic honeycomb structural body 10 formed by combining a plurality of pillar-shaped porous ceramic members (units) 11 through sealing material layers 14 to form a ceramic block and covering an outer periphery of the ceramic block with a sealing material layer 16 for preventing the leakage of the exhaust gas. As illustrated, the ceramic honeycomb structural body 10 takes a sectional form of circle, oval or polygon by bundling a plurality of ceramic members 11 each having a pillar-shaped structure as one constitutional unit. In the ceramic members 11, many cells 12 as a path for the exhaust gas are arranged in parallel to each other in longitudinal direction through cell walls 13. When the cells 12 are used as a filter, the end faces of them are alternately sealed with a plugging 15. When the exhaust gas passes through the cell walls 13, the particulates are collected by the cell walls 13, and hence the ceramic honeycomb structural body functions as a filter for the purification of the exhaust gas.

As a method of manufacturing the above ceramic honeycomb structural body is proposed a technique disclosed in Japanese unexamined patent publication No. H08-281036 (JP-A-H08-281036). This technique is a method wherein 100 parts by volume of silicon carbide powders having a mean particle size of 5 to 50 µm and a particle size ratio (D10/D50) of particle size with an oversize of 10% (based on mass) (D10) to particle size with an oversize of 50% (based on mass) of 0.2 or more in cumulative volume mean diameter MV (mean volume diameter) of particle size distribution and added with 10% or less by volume of a sintering aid is compounded with 15 to 25 parts by volume of a pore forming agent having a mean particle size of 40 to 100 µm and molded and fired in a non-oxidizing atmosphere at 1600° C. or more to form a honeycomb structural body.

The contents of JP-A-H08-281036 are incorporated herein by reference in its entirety.

BRIEF SUMMARY OF THE INVENTION

According to a first embodiment of the present invention, there is provided a ceramic honeycomb structural body formed by molding silicon carbide raw material powders into honeycomb pillar shape and then firing to form a sintered body, wherein said silicon carbide raw material powders are comprised of about 60 to about 80% by mass of particles belonging to a first particle group having a particle size of 1.0 µm to about 100 µm, and about 20 to about 40% by mass of particles belonging to a second particle group having a particle size of about 0.1 µm or more and less than 1.0 µm in which the particles of the first particle group has one frequency peak in a particle size distribution curve wherein an abscissa is a particle size (µm) and an ordinate is a frequency (%) and satisfy the following relationship:

$$(D_{90}-D_{10})/D_{50} \leq \text{about } 2.0$$

wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

Also, according to a second embodiment of the present invention, there is provided a ceramic honeycomb structural body formed by molding silicon carbide raw material powders into honeycomb pillar shape and then firing to form a sintered body having a porosity of about 50 to about 60% by volume, wherein said carbide raw material powders are comprised of about 60 to about 70% by mass of particles belonging to a first particle group having a particle size of 1.0 µm to about 100 µm, and about 30 to about 40% by mass of particles belonging to a second particle group having a particle size of about 0.1 µm or more and less than 1.0 µm in which the particles of the first particle group has one frequency peak in a particle size distribution curve wherein an abscissa is a particle size (µm) and an ordinate is a frequency (%) and satisfy the following relationship:

$$\text{about } 1.2 \leq (D_{90}-D_{10})/D_{50} \leq \text{about } 1.8$$

wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

Furthermore, according to a third embodiment of the present invention, there is provided a method of manufacturing a ceramic honeycomb structural body, which comprises mixing silicon carbide raw material powders, mixing it to prepare a ceramic powder raw materials, molding the resulting ceramic powder raw materials into honeycomb pillar shape, and firing it to form a sintered body, wherein said silicon carbide raw material powders are comprised of about 60 to about 80% by mass of particles belonging to a first particle group having a particle size of 1.0 µm to about 100 µm, and about 20 to about 40% by mass of particles belonging to a second particle group having a particle size of about 0.1 µm or more and less than 1.0 µm in which the particles of the first particle group has one frequency peak in a particle size distribution curve wherein an abscissa is a particle size (µm)

and an ordinate is a frequency (%) and satisfy the following relationship:

$(D_{90}-D_{10})/D_{50} \leq$ about 2.0 wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

Moreover, according to a fourth embodiment of the present invention, there is provided a method of manufacturing a ceramic honeycomb structural body, which comprises mixing silicon carbide raw material powders, mixing it to prepare a ceramic powder raw materials, molding the resulting ceramic powder raw materials into a honeycomb pillar shape, and firing it to form a sintered body having a porosity of about 50 to about 60% by volume, wherein said silicon carbide raw material powders are comprised of about 60 to about 70% by mass of particles belonging to a first particle group having a particle size of 1.0 μm to about 100 μm, and about 30 to about 40% by mass of particles belonging to a second particle group having a particle size of about 0.1 μm or more and less than 1.0 μm in which the particles of the first particle group has one frequency peak in a particle size distribution curve wherein an abscissa is a particle size (μm) and an ordinate is a frequency (%) and satisfy the following relationship:

about $1.2 \leq (D_{90}-D_{10})/D_{50} \leq$ about 1.8 wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

In the above embodiments of the invention, it is preferable that the silicon carbide raw material powders are mixed with a sintering aid and the sintering aid comprising one or more selected from the group consisting of rare earth elements, alkaline earth elements, aluminum and silicon may be used. The sintering aid is preferable to be included in an amount of about 1.0% by mass or less based on the total amount of the silicon carbide raw powders and the sintering aid. The firing temperature is preferable to be about 1800 to about 2300° C.

DETAILED DESCRIPTION OF THE EMBODIMENTS

In the first embodiment of the present invention, as silicon carbide is used a mixture of particles belonging to a first particle group having a particle size of 1.0 μm to about 100 μm and particles belonging to a second particle group having a particle size of about 0.1 μm or more and less than 1.0 μm in a cumulative particle size distribution.

Figure 2:
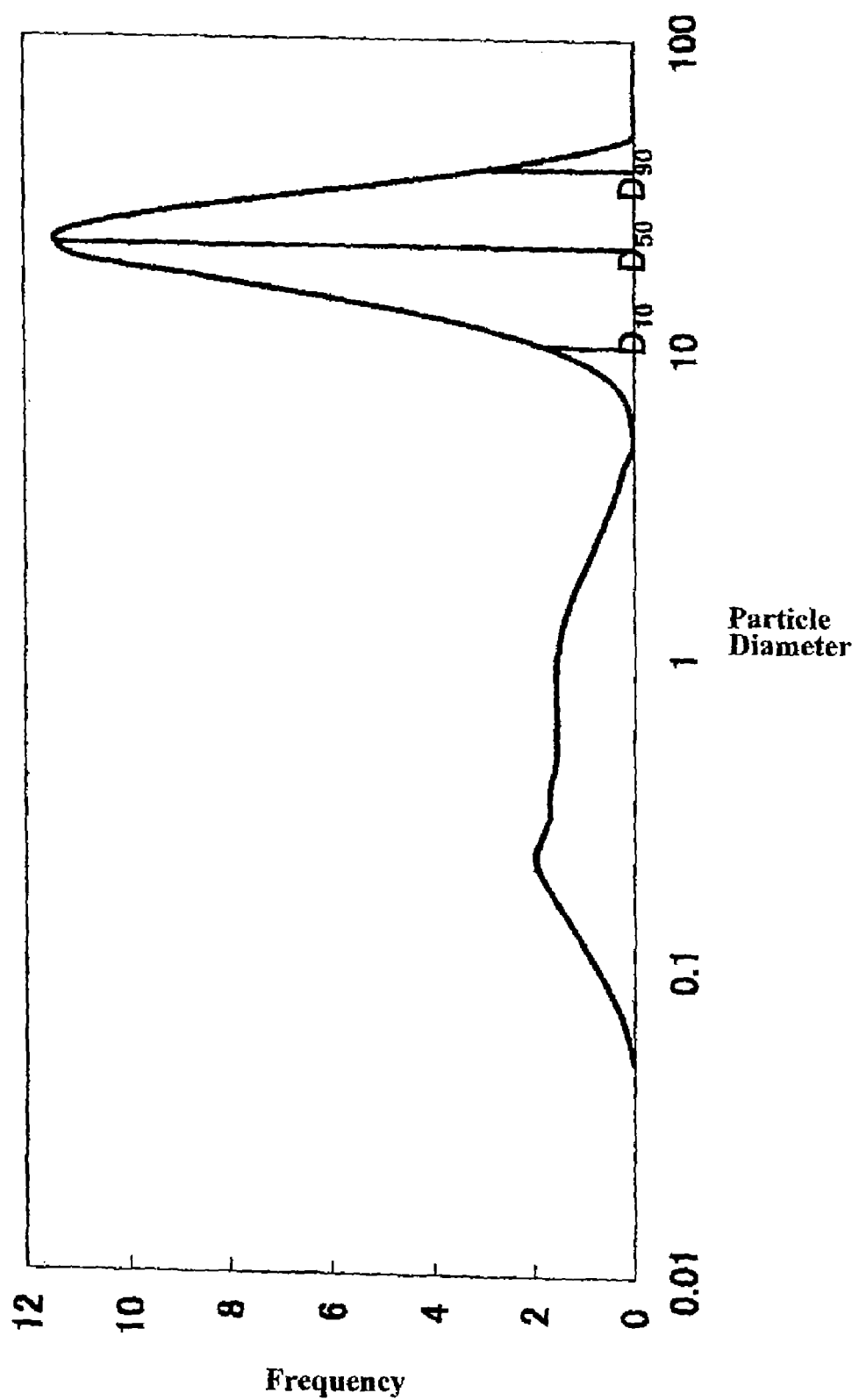
FIG. 2 is a graph showing a particle size distribution curve of silicon carbide raw powders in the ceramic honeycomb structural body according to the embodiment of the invention.

The particles belonging to the first particle group are used by controlling a particle size ratio of particle size with an oversize of 90% by mass ($D_{90}$), particle size with an oversize of 10% by mass ($D_{10}$) and particle size with an oversize of 50% by mass ($D_{50}$) in a cumulative particle size distribution curve as shown in FIG. 2 wherein an abscissa is a particle size (μm) and an ordinate is a frequency (%). The ceramic honeycomb structural body of the embodiment of the present invention is shaped by adjusting the particle size of silicon carbide particles as mentioned above, so that there are not caused the lowering of the strength and increase of pressure loss.

In the embodiments of the present invention, for example, $D_{90}$ means that when the cumulative curve is measured by rendering the total volume of powders into 100% and a particle size at a point that the cumulative curve is 90% as a mass standard is 90% particle size, a volume mean particle size larger than the above value (90% by mass) is a particle size with an oversize of 90% by mass ($D_{90}$).

As to the silicon carbide particles as a main component constituting the ceramic honeycomb structural body according to the embodiments of the present invention, the average particle size of the raw material of the first particle group is limited to about 1.0 μm to about 100 μm. Because, in the structural body formed by using the raw particles having an average particle size of about 1.0 μm or more, many fine pores are hardly produced, while by using the raw particles having an average particles size of about 100 μm or less hardly decreases the number of necked portions joining the particles to each other, and thereby to prevent the lowering of the strength. The large particles exceeding about 100 μm as the average particle size hardly cause the growth thereof, which also causes the lowering of the strength.

In the raw particles of the first particle group, if a large variance or dispersion is existent in the particle size distribution, many particles having particle sizes of less than 1.0 μm and more than about 100 μm are mixedly existent. On the other hand, when the particle size distribution of the raw particles is uniform (sharp particle size distribution), the dispersion of the particles is easily caused and the pore size becomes large and substantially the constant distribution is shown. However, when only the particles having a large particle size are existent, the sufficient sintering does not proceed, which causes the lowering of the strength.

In the embodiments of the present invention, therefore, the particles of the first particle group having a particle size of 1.0 μm to about 100 μm are made so that the particle size distribution of these particles has one peak, and the particles of the first particle group are mixed with the fine particles belonging to the second particle group having a particle size of about 0.1 μm or more and less than 1.0 μm in use. Thus, the driving force required for the sintering is increased by increase of extra energy through the surface energy and interface energy of the raw fine particles and the difference in the particle size between large-size particles and small-size particles, whereby the fine particles of the second particle group are provided between the particles of the first particle group, and hence the joining among the particles through the sintering becomes strong and it is possible to improve the strength as the sintered body.

Moreover, the particles of the first particle group having a particle size of about 1.0 μm to about 100 μm are used to satisfy the particle size ratio of the following relationship:

$(D_{90}-D_{10})/D_{50} \leq$ about 2.0 wherein $D_{90}$: particle size with an oversize of 90% by mass in cumulative particle size distribution; $D_{10}$: particle size with an oversize of 10% by mass in cumulative particle size distribution; and $D_{50}$: particle size with an oversize of 50% by mass in cumulative particle size distribution.

When the particle size ratio according to the above equation is about 2.0 or less, the pore size of the sintered body is hardly dispersed and the rise of the pressure loss hardly occurs. Further, it is considered that the joint portion of the small-size particles becomes hardly small in the joint area and the breakage therefrom is hardly caused when a stress is applied and hence the bending strength hardly lowers.

Also, the particles of the first particle group having a large particle size of 1.0 µm to about 100 µm and the particles of the second particle group having a small particle size of about 0.1 µm or more and less than about 1.0 µm are mixed at such a ratio that the amount of the particles of the first particle group is about 60 to about 80% by mass and the amount of the particles of the second particle group is about 20 to about 40% by mass. When the amount of the particles of the first particle group is about 60% by mass or more, the amounts of the particles of the second particle group and the sintering aid used become relatively small, and the pore size of the honeycomb structural body becomes hardly small. On the other hand, when it is about 80% by mass or less, the amounts of the particles of the second particle group and the sintering aid used become relatively large and the strength becomes hardly low.

In the manufacturing method of the ceramic honeycomb structural body according to the embodiments of the present invention, one or more selected from an organic binder, a sintering aid and a pore forming agent can be used as an assistant.

As the organic binder can be used, for example, polyvinyl alcohol, methyl cellulose, ethyl cellulose, carboxymethyl cellulose and the like. They may be used alone or in a combination of two or more. Among the organic binders, the use of methyl cellulose is desirable.

As the sintering aid, it is preferable to use a compound or a solid solution including one or more selected from the group of a rare earth element, an alkaline earth element, aluminum and silicon. For example, as the rare earth element are mentioned Y, Er, Yb, La, Sc, Ce, Nd, Dy, Sm, Gd and the like, and as the alkaline earth element are mentioned Mg, Ca, Ba, Sr and the like. Particularly, it is preferable to include alumina as an oxide of aluminum in the sintering aid.

Moreover, the amount of the sintering aid added is preferable to be about 1.0% by mass or less per the total amount of silicon carbide particles and sintering aid. For example, when explaining the use of alumina as the sintering aid, alumina is reduced to metallic aluminum by carbon included in silicon carbide on the way of firing the honeycomb structural body in an inert gas, and the metallic aluminum is existent in necked portions among the particles. However, since the melting point of aluminum is as low as about 660° C., it is considered that if the honeycomb structural body is exposed to a higher temperature of about 900° C., the metallic aluminum existing in the necked portions is softened to lower the strength as the honeycomb structural body. Therefore, as the existing amount of aluminum element becomes large, the necked portions formed by the metallic aluminum becomes large, so that the amount of the sintering aid added is preferable to be about 1.0% by mass or less.

The pore forming agent is added for manufacturing a high porosity sintered body having a porosity of about 50 to about 60% by volume. As the pore forming agent can be used one or more materials selected from balloons as a micro-hollow sphere composed mainly of oxide ceramics, spherical acryl particles and graphite. As the oxide balloon are mentioned alumina balloon, glass micro-balloon, silas balloon, fly ash balloon and mullite balloon.

However, the pores formed by the pore forming agent is tend to become large in the pore size. As the porosity becomes large, the strength of the honeycomb structural body easily lowers. In the embodiment of the present invention, therefore, when the high porosity honeycomb structural body having a porosity of about 50 to about 60% by volume is prepared, the large particle size in the silicon carbide raw powders, i.e. particle size of particles of the first particle group is uniformized to satisfy the following relationship, and further the mixing ratio of the particles of the second particle group contributing to the sintering is made about 30 to about 40% by mass. Thus, the driving force requiring for the sintering is more increased by increase of extra energy through the surface energy and interface energy of the raw fine particles and the large difference in the particle size between large-size particles and small-size particles, and the boundary of the particles is largely formed, and hence the lowering of the bending strength is possible to be suppressed.

$$\text{about } 1.2 \leq (D_{90}-D_{10})/D_{50} \leq \text{about } 1.8$$

wherein $D_{90}$: particle size with an oversize of 90% by mass in cumulative particle size distribution; $D_{10}$: particle size with an oversize of 10% by mass in cumulative particle size distribution; and $D_{50}$: particle size with an oversize of 50% by mass in cumulative particle size distribution.

Moreover, when the particle size ratio is less than about 1.2, the variance or dispersion of the particles is very small and the driving force for the sintering is small. In order to make the driving force for the sintering large, the mixing ratio of the particles of the second particle group must be made large. In this case, however, the porosity after the sintering easily lowers.

On the other hand, when the particle size ratio exceeds about 1.8, the variance or dispersion of the pore size in the sintered body and the rise of the pressure loss are caused. Further, it is considered that the joint portion among the small-size particles is small in the joint area and the breakage is caused from this portion under an action of the pressure to lower the bending strength.

As a result of the inventors' studies, it has been found that the high strength is not obtained in the sintered body formed by firing after the molding of silicon carbide raw material having a relatively large particle size and a narrow particle size distribution. In general, the sintering is considered to be a phenomenon that generating a mass diffusion at particle surfaces using an extra energy of surface energy and interfacial energy as a driving force. Therefore, the raw material particles useful for the sintering are required to be small in the particle size and wide in the particle size distribution. Inversely, when the sintering becomes disadvantageous when the particle size of the raw material particles is large and the particle size distribution thereof is narrow. For this end, when particles having a large particle size are merely aggregated, the sintering hardly proceeds, so that it is required to add the sintering aid. However, even if the sintering aid is added, the addition amount becomes large for sufficiently proceeding the sintering, and hence the bending strength of the sintered body lowers at a high temperature.

The ceramic honeycomb structural body obtained by the embodiments of the present invention is sharp in the pore distribution (the width of the pore distribution curve becomes narrow), so that the pressure loss is possible to be low. Furthermore, the resulting sintered body is uniform in the texture, which is possible to provide a ceramic honeycomb structural body having a high bonding strength between the particles.

In the manufacture of the ceramic honeycomb structural body according to the embodiments of the present invention, (1) as the raw powders is used α-type silicon carbide having a good thermal conductivity, which is divided into large-size particles of the first particle group and small-size particles of the second particle group, and these particle groups are mixed at a given ratio. In this case, they are mixed with any one of the aforementioned assistants, if necessary, and mixed to prepare ceramic powder raw materials.

(2) The ceramic powder raw materials are extrusion-molded through a die into a honeycomb body having many through-holes (cells) for a honeycomb structural body having a cylindrical, cylindroids or polygonal pillar shape.

(3) When the honeycomb molded body is used as a filter, the through-holes (cells) at either one end of the body are alternately sealed with a plugging. On the other hand, when it is used as a catalyst carrier, a catalyst comprising a metal or a metal oxide of a platinum group is supported on wall surfaces of the cells without disposing the plugging on the opening ends. In the latter case, γ-Al$_2$O$_3$ or the like may be used as a support member.

(4) The ceramic honeycomb raw molded body is fired at a temperature of about 1800 to about 2300° C. Since silicon carbide is hardly sintered, it is required to carry out the firing at a higher temperature (e.g. about 2200° C.), but when it is mixed with the sintering aid, the sintered body is possible to have a sufficient strength even at a temperature of about 1800 to about 2100° C.

Alternately, the firing may be carried out after the degreasing of the ceramic honeycomb raw molded body.

Figure 1:
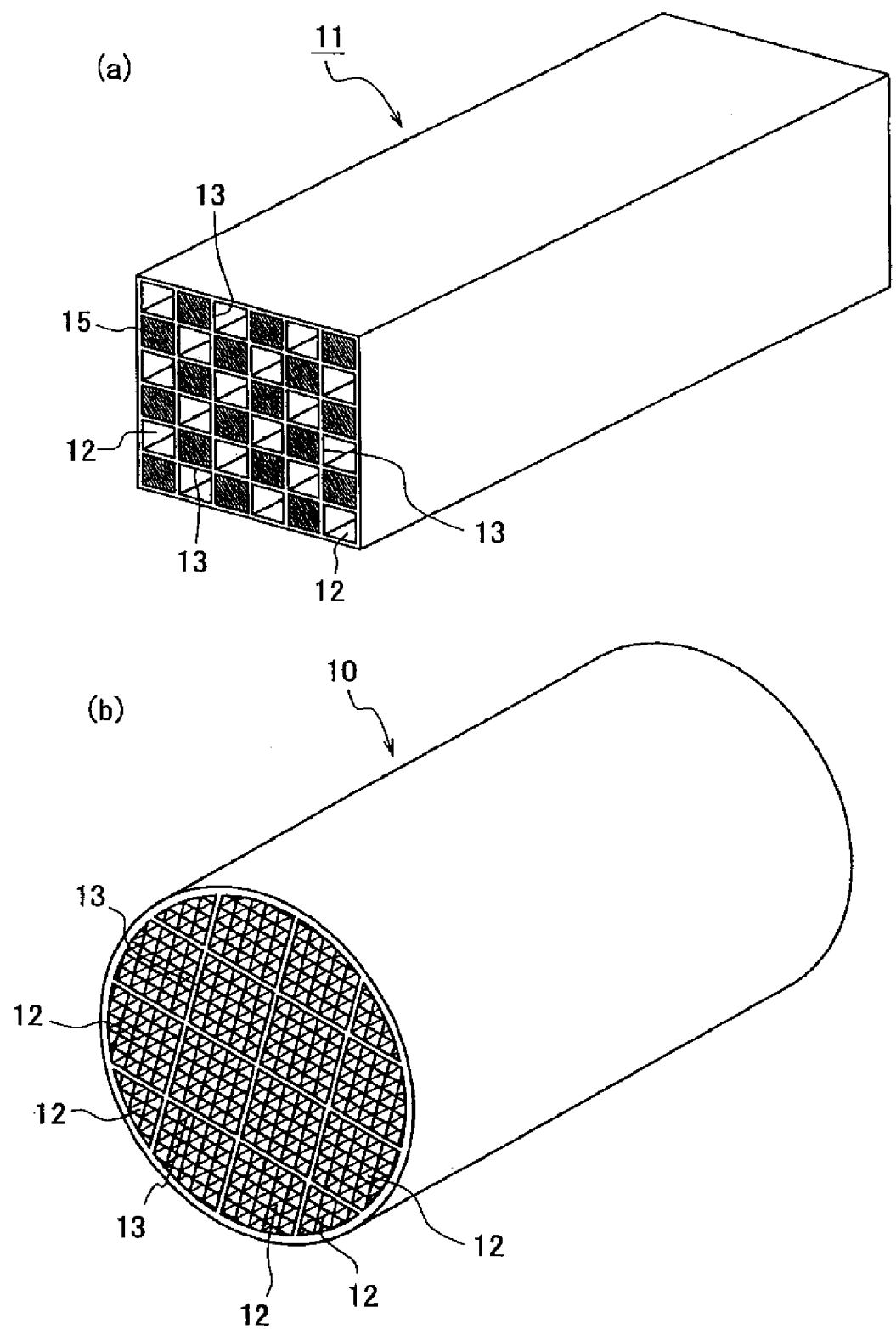
FIG. 1A is a perspective view illustrating a porous ceramic member.
FIG. 1B is a perspective view illustrating collective type ceramic honeycomb filter according to the embodiment of the present invention.

In the thus obtained ceramic honeycomb structural body, there is used one ceramic member 11 (integrated type) having many cells 12 arranged side by side as a path for the exhaust gas as shown in FIG. 1A or an assembly 10 obtained by combining a plurality of ceramic members 11 as shown in FIG. 1B. In FIG. 1A, the ceramic member 11 is formed in square pillar shape, and preferably formed in cylindrical pillar shape. When this structural body is used as a filter, the opening end portions at either of inlet side or outlet side for the exhaust gas in the cells 12 are sealed with the plugging 15, for example, in a checkered pattern. In this case, the cell wall between the mutual cells 12 functions as a filter.

That is, when the gas flowed into the end portion of the cell 12 at the inlet side for the exhaust gas passes through the cell wall 13 owing to the sealed structure of the other end portion thereof, the particulates are collected (trapped) with the cell wall 13, and hence the gas after the removal of the particulates is discharged through the adjoining cell 12 not sealed at the other end portion.

On the other hand, when the ceramic honeycomb structural body 10 is used as a catalyst carrier by carrying a catalyst metal such as Pt, Ph, Rh or the like on the surfaces of the cell walls, the exhaust gas is converted in the passing through the cells 12 to discharge as a clean gas.

EXAMPLES

The present invention is explained in detail with reference to the following examples applying to a filter for the purification of the exhaust gas, but is not intended as limitations thereof.

At first, 7000 parts by mass of α-type silicon carbide powders as particles of a first particle group and 3000 parts by mass of α-type silicon carbide powders as particles of a second particle group are mixed with 2970 parts by mass of water, and added with 1050 parts by mass of methyl cellulose as an organic binder and a proper amount (variable every one example) of Al$_2$O$_3$ as a sintering aid and then kneaded with 230 parts by mass of glycerin as a plasticizer and 500 parts by mass of a lubricant (Unirube, trade name, made by NOF Corporation) to prepare ceramic powder raw materials. The ceramic powder raw materials are molded by extrusion-molding through a die into a target honeycomb shape to manufacture a honeycomb molded body having many through-holes (cells), either of end portions of the through-holes (cells) are sealed in a checkered pattern to obtain a raw molded body.

Then, the resulting raw molded body is dried by means of a microwave drier, degreased at 400° C. for 3 hours and thereafter fired in an argon atmosphere of a normal pressure at 2000° C. for 3 hours to manufacture a honeycomb structural body (filter) of a silicon carbide sintered body having a size of 34.3 mm×34.3 mm×150 mm, number of through-holes of 31 holes/cm$^2$ (200 cpsi) and a partition wall thickness of 0.3 mm.

Experimental Examples 1 to 20

With respect to the above-manufactured honeycomb structural body, mean particle sizes of the particles of the first particle group and the particles of the second particle group as silicon carbide raw materials, the mixing ratio of the particles of the second particle group, the particle size ratio ((D90−D10)/D50) of particles with oversize of 90% by mass, oversize of 10% by mass and oversize of 50% by mass in the cumulative particle size distribution, the addition amount of the sintering aid and the firing temperature are shown in Table 1. Also, Table 1 shows results measured on average pore size, porosity, pore distribution, three-point bending strength at room temperature and three-point bending strength at 900° C. as the following evaluation results.

TABLE 1

| Experimental Examples | Average particle size of first particle group (μm) | Average particle size of second particle group (μm) | Mixing rate of second particle group (%) | (D90 − D10)/D50 | Addition amount of sintering aid (%) | Firing temperature (° C.) |
| --- | --- | --- | --- | --- | --- | --- |
| 1 | 22 | 0.5 | 20 | 1.2 | 0 | 2250 |
| 2 | 22 | 0.5 | 20 | 1.3 | 0.5 | 2100 |
| 3 | 22 | 0.5 | 20 | 1.3 | 1.0 | 2100 |
| 4 | 30 | 0.5 | 25 | 1.2 | 0 | 2250 |
| 5 | 30 | 0.5 | 25 | 2.0 | 0.5 | 2100 |
| 6 | 30 | 0.5 | 25 | 1.3 | 1.0 | 2100 |
| 7 | 40 | 0.5 | 30 | 1.4 | 0 | 2250 |
| 8 | 40 | 0.5 | 30 | 1.2 | 0.5 | 2100 |
| 9 | 40 | 0.5 | 30 | 1.3 | 1.0 | 2100 |
| 10 | 22 | 0.5 | 20 | 2.1 | 0.5 | 2100 |
| 11 | 30 | 0.5 | 25 | 2.5 | 0.5 | 2100 |

TABLE 1-continued

| | | | | | | |
|---|---|---|---|---|---|---|
| 12 | 40 | 0.5 | 30 | 2.2 | 0.5 | 2100 |
| 13 | 22 | 0.5 | 0 | 1.8 | 0.0 | 2250 |
| 14 | 30 | 0.5 | 10 | 1.7 | 0.0 | 2100 |
| 15 | 40 | 0.5 | 15 | 1.7 | 0.0 | 2100 |
| 16 | 22 | 0.5 | 45 | 1.5 | 0.0 | 2100 |
| 17 | 30 | 0.5 | 50 | 1.6 | 0.0 | 2100 |
| 18 | 22 | 0 | 20 | 1.7 | 5.0 | 2100 |
| 19 | 30 | 0 | 25 | 1.5 | 5.0 | 2100 |
| 20 | 40 | 0 | 30 | 1.8 | 5.0 | 2100 |

| Experimental Examples | Average pore size (μm) | Porosity (%) | Pore distribution (stdev.) | Bending strength (room temperature) (MPa) | Bending strength (900° C.) (Mpa) |
|---|---|---|---|---|---|
| 1 | 12.5 | 41.4 | 0.07 | 55.4 | 53.3 |
| 2 | 8.3 | 38.2 | 0.06 | 54.0 | 50.9 |
| 3 | 8.8 | 38.2 | 0.05 | 52.7 | 45.1 |
| 4 | 16.0 | 44.6 | 0.08 | 38.4 | 37.8 |
| 5 | 10.0 | 39.6 | 0.05 | 47.8 | 45.5 |
| 6 | 10.9 | 39.3 | 0.06 | 44.4 | 37.6 |
| 7 | 18.5 | 41.4 | 0.09 | 33.2 | 32.7 |
| 8 | 12.8 | 38.3 | 1.00 | 35.8 | 33.2 |
| 9 | 13.1 | 38.8 | 0.09 | 36.2 | 31.6 |
| 10 | 6.8 | 39.2 | 0.31 | 27.3 | 22.9 |
| 11 | 7.6 | 38.3 | 0.29 | 27.9 | 21.2 |
| 12 | 9.2 | 40.5 | 0.29 | 25.4 | 20.7 |
| 13 | 12.1 | 42.1 | 0.15 | 12.4 | 12.1 |
| 14 | 15.4 | 42.9 | 0.09 | 14.2 | 13.7 |
| 15 | 18.2 | 43.5 | 0.12 | 10.2 | 9.8 |
| 16 | 6.1 | 33.7 | 1.08 | 62.3 | 60.7 |
| 17 | 7.6 | 30.2 | 0.87 | 59.7 | 58 |
| 18 | 7.1 | 34.8 | 0.07 | 54.1 | 18.5 |
| 19 | 7.5 | 35.5 | 0.05 | 49.7 | 18.4 |
| 20 | 10.3 | 36.8 | 1.02 | 41.3 | 14.3 |

Moreover, the average pore size, porosity and pore distribution are measured by a mercury pressure method according to JIS-R1655 using an auto-porosimeter, "Autopore III9405" made by Shimadzu Corporation as a measuring device. Concretely, the honeycomb structural body is cut into a cube of about 0.8 cm, which is supersonic-washed with an ion-exchanged water and dried, and thereafter the measurement is carried out within a measuring range of 0.2 to 500 μm using the above measuring device. The measurement is carried out every a pressure of 0.1 psia within a range of 100 to 500 μm and every a pressure of 0.25 psia within a range of 0.2 to 100 μm.

The three-point bending strength is measured according to JIS-R1601 using Model 5582, made by Instron Corp. as a measuring device. Concretely, it is determined by measuring a mechanical failing load under conditions that a crosshead speed is 0.5 mm/min and a span distance is 125 mm and a load is applied to the through-holes in a vertical direction. The three-point bending strength at 900° C. is measured with respect to the honeycomb structural body heated to 900° C. (immediately after the body is taken out from the heating furnace).

The contents of JIS-R1655 and JIS-R1601 are incorporated herein by reference in its entirety.

Experimental Examples 1 to 9 are the measured results when the mixing ratio of the particles of the second particle group is within a range of 20 to 30% by mass and the particle size ratio is 2.0 or less, and Experimental Examples 10 to 12 are the results when the particle size ratio is more than 2.0, and Experimental Examples 13 to 15 are the results when the mixing ratio of the particles of the second particle group is less than 20% by mass, and Experimental Examples 16 and 17 are the results when the mixing ratio of the particles of the second particle group is more than 40% by mass, and Experimental Examples 18 to 20 are the results when the addition amount of the sintering aid is more than 1.0% by mass.

In all of Experimental Examples 1 to 9, the high strength is obtained because the bending strengths at room temperature and under the heating at 900° C. are 30 MPa or more. In Experimental Example 1, the bending strength of 50 MPa or more is particularly obtained at room temperature and under the heating at 900° C. even if the sintering aid is not added.

On the other hand, when the particle size ratio is more than 2.0 (Experimental Examples 10 to 12), since many particles having a large mean particle size are existent, the number of necked portions becomes less and the bending strength is low. Also, when the mixing ratio of the particles of the second particle group is less than 20% by mass (Experimental Examples 13 to 15), the presence of the small-size particles is less, and hence the insufficiently sintered portions are existent and the bending strength becomes as low as about 10 MPa, while when the mixing ratio of the particles of the second particle group is more than 40% by mass (Experimental Examples 16 and 17), the high bending strength of about 60 MPa is obtained, but the pore size becomes fairly small because the presence of the small-size particles is too large. Further, when the addition amount of the sintering aid is exceeds 1.0% by mass (Experimental Examples 18 to 20), the bending strength at room temperature is high, but the strength at a higher temperature is low because the bending strength lowers when being heated to 900° C. This is considered due to the fact that a great amount of alumina added as the sintering aid is reduced to metallic aluminum which is existent in the necked portions of the particles and exerts influence upon the sintered body.

Experimental Examples 21 to 30

With respect to honeycomb structural bodies manufactured in the same manner as in Experimental Examples 1 to 20 and having a porosity of 50 to 60 volume %, mean particles sizes of the particles in the first particle group and second particle group of the silicon carbide raw materials, the mixing ratio of the particles of the second particle group, the particle size ratio ((D90−D10)/D50) of particles with oversize of 90% by mass, oversize of 10% by mass and oversize of 50% by mass in the cumulative particle size distribution, the addition amount of the sintering aid and the firing temperature are shown in Table 2. Also, the average pore size, porosity and three-point bending strength at room temperature as evaluation results are also shown in Table 2. Moreover, the measurement of the average pore size and porosity is carried out in the same manner as in Experimental Examples 1 to 20.

honeycomb pillar shape, and firing it to form a sintered body, wherein said silicon carbide raw powders are comprised of about 60 to about 80% by mass of particles belonging to a first particle group having a particle size of 1.0 μm to about 100 μm, and about 20 to about 40% by mass of particles belonging to a second particle group having a particle size of about 0.1 μm or more and less than 1.0 μm in which the particles of the first particle group has one frequency peak in a particle size distribution curve wherein an abscissa is a particle size (μm) and an ordinate is a frequency (%) and satisfy the following relationship:

$$(D_{90}-D_{10})/D_{50} \leq \text{about } 2.0$$

wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

2. A method of manufacturing a ceramic honeycomb structural body according to claim 1, wherein when the silicon

TABLE 2

| Experimental Examples | Average particle size of first particle group (μm) | Average particle size of second particle group (μm) | Mixing rate of second particle group (%) | (D90 − D10)/ D50 | Addition amount of sintering aid (%) | Firing temperature (° C.) | Average pore size (μm) | Porosity (%) | Bending strength (room temperature) (MPa) |
|---|---|---|---|---|---|---|---|---|---|
| 21 | 30 | 0.5 | 30 | 1.4 | 0 | 2250 | 20.5 | 53.1 | 34.1 |
| 22 | 30 | 0.5 | 35 | 1.3 | 0.5 | 2100 | 22.5 | 55.8 | 32.7 |
| 23 | 30 | 0.5 | 40 | 1.5 | 1.0 | 2100 | 21.1 | 51.4 | 37.8 |
| 24 | 40 | 0.5 | 30 | 1.2 | 0 | 2250 | 22.5 | 54.8 | 33.9 |
| 25 | 40 | 0.5 | 35 | 1.4 | 0.5 | 2100 | 22.0 | 52.6 | 34.2 |
| 26 | 40 | 0.5 | 40 | 1.2 | 1.0 | 2100 | 20.7 | 54.4 | 33.8 |
| 27 | 30 | 0.5 | 20 | 1.4 | 0 | 2250 | 21.3 | 51.4 | 21.5 |
| 28 | 40 | 0.5 | 25 | 1.3 | 0.5 | 2100 | 20.7 | 53.6 | 22.3 |
| 29 | 30 | 0.5 | 35 | 2.0 | 1.0 | 2100 | 22.6 | 49.2 | 22.9 |
| 30 | 40 | 0.5 | 40 | 1.9 | 0 | 2250 | 22.1 | 54.1 | 22.4 |

Experimental Examples 21 to 26 are the measured results when the particle size ratio is within a range of 1.2 to 1.8 and the mixing ratio of the particles of the second particle group is within a range of 30 to 40% by mass, and Experimental Examples 27 and 28 are the results when the mixing ratio of the particles of the second particle group is less than 30% by mass, and Experimental Examples 29 and 30 are the results when the particle size ratio is more than 1.8.

In all of Experimental Examples 21 to 26, the high bending strength of 30 MPa or more is obtained. In Experimental Examples 27 and 28, the small-size particles of the second particle group is small, so that the sufficient bonding between the particles is not obtained and the bending strength lowers. Similarly, in Experimental Examples 29 and 30, the large-size particles are large, so that the number of necked portions becomes less and the sufficient strength is not obtained.

As having been described before, the embodiments of the present invention is applied to a filter for the purification of the exhaust gas discharged from the internal combustion engine such as diesel engine, and it may also be applied to the catalyst carrier for the conversion of the exhaust gas, and it is presumed to have same effects as the filter.

What is claimed is:

1. A method of manufacturing a ceramic honeycomb structural body, which comprises mixing silicon carbide raw powders, mixing it to prepare ceramic powder raw materials, molding the resulting ceramic powder raw materials into a carbide raw powders are added and mixed with a sintering aid to prepare ceramic powder raw materials and the ceramic powder raw materials are molded into a honeycomb pillar shape and fired to form the ceramic honeycomb structural body, as the sintering aid comprising one or more selected from the group consisting of rare earth elements, alkaline earth elements, aluminum and silicon are used.

3. A method of manufacturing a ceramic honeycomb structural body according to claim 1, wherein the sintering aid is included in an amount of about 1.0% or less by mass based on the total amount of the silicon carbide raw powders and the sintering aid.

4. A method of manufacturing a ceramic honeycomb structural body according to claim 1, wherein a temperature of the firing is about 1800 to about 2300° C.

5. A method of manufacturing a ceramic honeycomb structural body, which comprises mixing silicon carbide raw powders, mixing it to prepare ceramic powder raw materials, molding the resulting ceramic powder raw materials into a honeycomb pillar shape, and firing it to form a sintered body having a porosity of about 50 to about 60% by volume, wherein said silicon carbide raw powders are comprised of about 60 to about 70% by mass of particles belonging to a first particle group having a particle size of 1.0 μm to about 100 μm, and about 30 to about 40% by mass of particles belonging to a second particle group having a particle size of about 0.1 μm or more and less than 1.0 μm in which the particles of the first particle group has one frequency peak in a particle size distribution curve wherein an abscissa is a particle size (μm) and an ordinate is a frequency (%) and satisfy the following relationship:

$$\text{about } 1.2 \leq (D_{90}-D_{10})/D_{50} \leq \text{about } 1.8$$

wherein $D_{90}$: particle size with an oversize of 90% by mass in cumulative particle size distribution;

$D_{10}$: particle size with an oversize of 10% by mass in cumulative particle size distribution; and $D_{50}$: particle size with an oversize of 50% by mass in cumulative particle size distribution.

6. A method of manufacturing a ceramic honeycomb structural body according to claim 5, wherein when the silicon carbide raw powders are added and mixed with a sintering aid to prepare ceramic powder raw materials and the ceramic powder raw materials are molded into a honeycomb pillar shape and fired to form the ceramic honeycomb structural body, as the sintering aid comprising one or more selected from the group consisting of rare earth elements, alkaline earth elements, aluminum and silicon are used.

7. A method of manufacturing a ceramic honeycomb structural body according to claim 5, wherein the sintering aid is included in an amount of about 1.0% or less by mass based on the total amount of the silicon carbide raw powders and the sintering aid.

8. A method of manufacturing a ceramic honeycomb structural body according to claim 5, wherein a temperature of the firing is about 1800 to about 2300° C.

\* \* \* \* \*